US007289861B2

(12) United States Patent
Aneweer et al.

(10) Patent No.: US 7,289,861 B2
(45) Date of Patent: Oct. 30, 2007

(54) PROCESS CONTROL SYSTEM WITH AN EMBEDDED SAFETY SYSTEM

(75) Inventors: Tom Aneweer, Round Rock, TX (US); Kent A. Burr, Round Rock, TX (US); Larry O. Jundt, Round Rock, TX (US); Gary K. Law, Georgetown, TX (US); Marty J. Lewis, Cedar Park, TX (US); Julian K. Naidoo, Cedar Park, TX (US); Michael G. Ott, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 894 days.

(21) Appl. No.: 10/352,396

(22) Filed: Jan. 28, 2003

(65) Prior Publication Data

US 2004/0158713 A1 Aug. 12, 2004

(51) Int. Cl.
*G06F 19/00* (2006.01)
*G06F 11/00* (2006.01)
(52) U.S. Cl. ............................ 700/110; 714/24; 714/31
(58) Field of Classification Search ............... 700/110, 700/21; 326/14; 714/699, 709, 24, 31, 47, 714/8, 21; 702/35, 185
See application file for complete search history.

(56) References Cited

U.S. PATENT DOCUMENTS

| | | | |
|---|---|---|---|
| 3,849,056 A | | 11/1974 | Schuss |
| 4,410,329 A | * | 10/1983 | Blevins et al. .................. 8/158 |
| 4,598,355 A | * | 7/1986 | Shepler et al. ................ 700/79 |
| 4,816,647 A | * | 3/1989 | Payne .................... 219/448.12 |
| 5,195,098 A | * | 3/1993 | Johnson et al. .............. 714/753 |

(Continued)

FOREIGN PATENT DOCUMENTS

DE 29824256 7/2001

(Continued)

OTHER PUBLICATIONS

Examination Report under Section 18(3) issued in GB 0401722.4 application by the United Kingdom Patent Office on Sep. 30, 2005.

(Continued)

*Primary Examiner*—Thomas K. Pham
(74) *Attorney, Agent, or Firm*—Marshall, Gerstein & Borun LLP

(57) ABSTRACT

A process plant includes a process control system having a safety system embedded therein. The integrated process control and safety system includes a host computer arranged to send and receive process level messages and safety level messages, a controller operatively connected to the host computer by a first communication network, at least one first input/output device adapted for operative communication with at least one process control field device, and at least one second input/output device adapted for operative communication with at least one safety-related field device. The first and second input/output devices are operatively connected to the controller via a second communication bus. The second input/output device includes a processor programmed to monitor both the process level messages and the safety level messages, to distinguish the process level messages from safety level messages, to select the safety level messages and to communicate with the safety-related field device based on the safety level messages.

41 Claims, 4 Drawing Sheets

U.S. PATENT DOCUMENTS

| | | | |
|---|---|---|---|
| 5,420,397 A * | 5/1995 | Weiss et al. | 219/501 |
| 5,553,237 A * | 9/1996 | Eisenberg et al. | 714/47 |
| 5,768,119 A | 6/1998 | Havekost et al. | |
| 5,838,563 A | 11/1998 | Dove et al. | |
| 5,864,657 A * | 1/1999 | Stiffler | 714/15 |
| 5,940,294 A | 8/1999 | Dove | |
| 5,984,504 A * | 11/1999 | Doyle et al. | 700/108 |
| 6,078,320 A | 6/2000 | Dove et al. | |
| 6,445,963 B1 | 9/2002 | Blevins et al. | |
| 6,647,301 B1 * | 11/2003 | Sederlund et al. | 700/79 |
| 6,915,444 B2 * | 7/2005 | Vasko et al. | 714/4 |
| 6,999,824 B2 * | 2/2006 | Glanzer et al. | 700/18 |
| 7,107,358 B2 * | 9/2006 | Vasko et al. | 709/249 |
| 2002/0013629 A1 | 1/2002 | Nixon et al. | |
| 2004/0059917 A1 * | 3/2004 | Powers | 713/176 |

FOREIGN PATENT DOCUMENTS

| | | |
|---|---|---|
| DE | 10247520 | 4/2004 |
| EP | 1 396 772 | 3/2004 |
| WO | WO-01/14940 | 3/2001 |
| WO | WO-2004/057430 | 7/2004 |

OTHER PUBLICATIONS

Search Report under Section 17 issued in GB 0401722.4 application by the United Kingdom Patent Office issued Jun. 28, 2004.

Examination Report under Section 18(3) issued in Gb 0401718.2 application by the United Kingdom Patent Office on Sep. 28, 2005.

Combined Search and Examination Report under Sections 17 and 18(3) issued in GB0602510.0 application by the United Kingdom Patent Office on Jun. 29, 2006.

Combined Search and Examination Report under Sections 17 and 18(3) issued in GB0602514.2 application by the United Kingdom Patent Office on Jun. 29, 2006.

* cited by examiner

PROCESS CONTROL SYSTEM WITH AN EMBEDDED SAFETY SYSTEM

FIELD OF TECHNOLOGY

The present invention relates generally to safety systems used in process plants and, more particularly, to a safety system that is embedded or integrated into a process control system of a process plant.

DESCRIPTION OF THE RELATED ART

Process control systems, like those used in chemical, petroleum or other processes, typically include one or more process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses to the field devices to control the operation of the process. Information from the field devices and the controllers is typically made available to one or more applications executed by the operator workstation to enable an operator to perform any desired function with respect to the process, such as configuring the process, viewing the current state of the process, modifying the operation of the process, etc.

Furthermore, in many processes, a separate safety system is provided to detect significant safety related problems within the process plant and to automatically close valves, remove power from devices, switch flows within the plant, etc. when a problem occurs which might result in or lead to a serious hazard in the plant, such as a spill of toxic chemicals, an explosion, etc. These safety systems typically have one or more separate controllers, apart from the process control controllers, which are connected to safety field devices via separate buses or communication lines disposed within the process plant. The safety controllers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event is detected, the safety controller takes some action to limit the detrimental effect of the event, such as closing valves, turning devices off, removing power from sections of the plant, etc.

Isolation between process controllers and safety controllers is considered important (and is frequently mandated by applicable government standards) because using a process controller to perform safety functions results in the simultaneous failure of the safety functions and the process control functions when that process controller fails. However, the safety functions become most critical when the process controller fails because, at that time, the process is wholly or partially out of control.

Unfortunately, the isolation between the process controllers and the safety controllers in process plants has led to these systems being completely separated from one other. As a result, different communication infrastructure is typically used to implement these different systems within the same plant, with different configuration applications and workstations being used to configure and monitor these separate systems. Because of these differences, different personnel are typically needed to perform configuration and monitoring activities with respect to these different systems, all of which leads to extra costs in terms of configuring and running a process plant that uses a safety system.

Moreover, because safety systems do not use the process control system infrastructure, different and completely unconnected safety system hardware is frequently used at different locations, such as at different nodes, within the same process plant. This leads to a number of different and unconnected safety systems in the same plant that must be configured and monitored separately.

SUMMARY OF THE DISCLOSURE

A process plant includes a safety system that is physically integrated with a process control system in a manner that enables the safety system and the process control system to use common communication, configuration and display hardware and software within the process plant while still providing functional isolation between the safety system controllers and the process control system controllers. Still further, the safety system hardware at different nodes of a process plant may communicate with one another to produce a single and integrated safety system within the process plant.

As is typical, separate safety system controllers are connected via safety communication infrastructure to safety devices while process control system controllers are connected to control system field devices via standard control system busses or communication lines. However, the safety system controllers are communicatively connected to the process control system controllers via a bus or other communication line and each is connected to one or more operator workstations within the process plant via a common communication network, which enables software within the operator workstations to communicate with, configure and view the operation of both the process controllers (and related process control field devices) and the safety controllers (and related safety field devices). However, while the safety system and the process control system controllers can communicate with one another to thereby obtain information with one another, they are configured so that the process control system controllers cannot control or configure any of the safety system devices, which provides the necessary functional isolation between and the process control system and the safety system.

This integration eliminates the need for additional communication and display structure within the plant that is not strictly needed for proper operation of the safety system apart from the process control system and enables a configuration application associated with the process plant to configure both the process control system and the safety control system and to display both the process control and the safety control hardware and software in a common or integrated view of the process plant.

DETAILED DESCRIPTION

Figure 1:
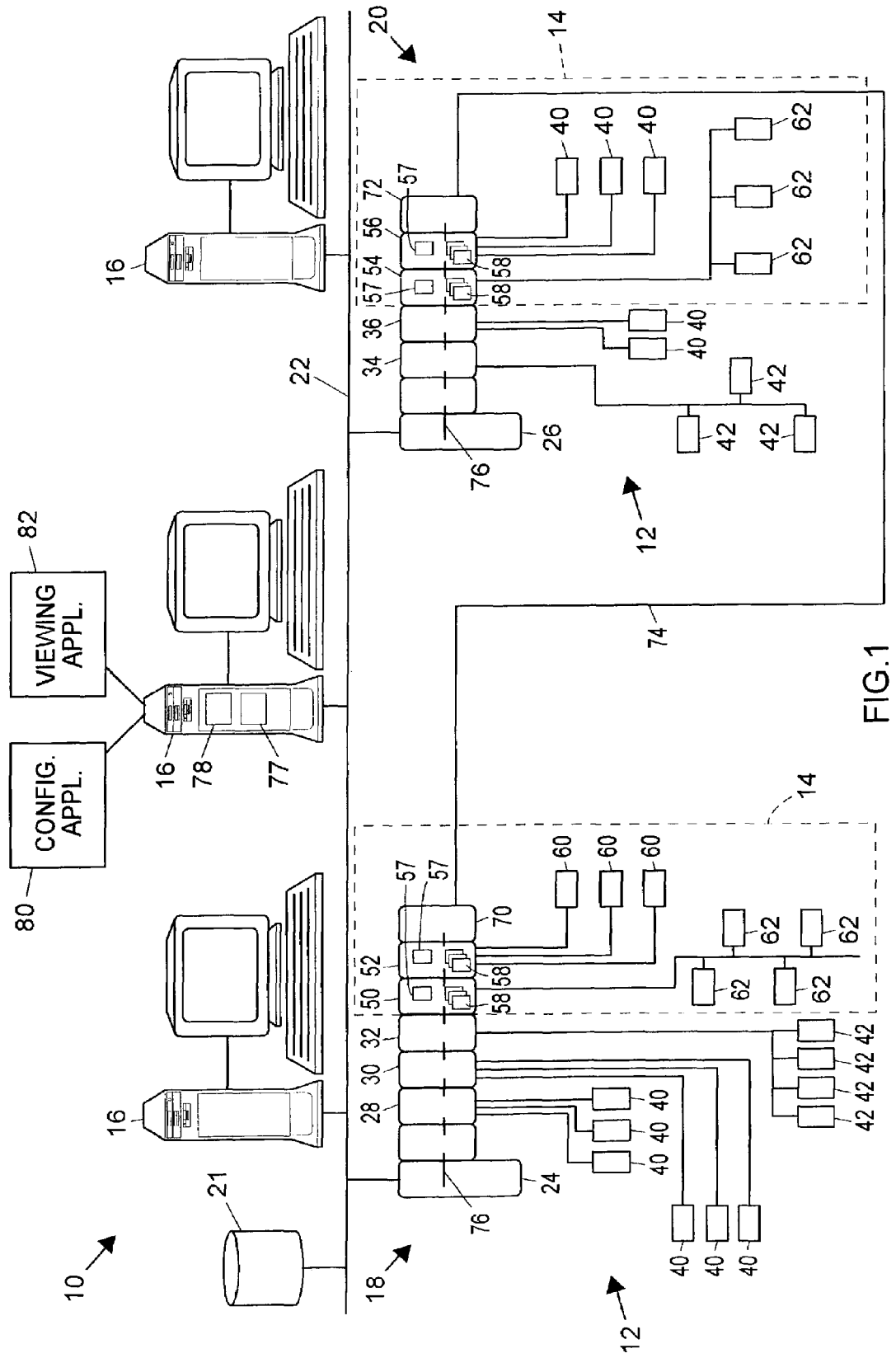
FIG. 1 is a block diagram of an exemplary process plant having a safety system integrated with a process control system.

Referring now to FIG. 1, a process plant 10 includes a process control system 12 integrated with a safety system 14 (indicated by dotted lines), which generally operates as a Safety Instrumented System (SIS) to monitor and override the control provided by the process control system 12 to maximize the likely safe operation of the process plant 10. The process plant 10 also includes one or more host workstations, computers or user interfaces 16 (which may be any type of personal computers, workstations, etc.) which are accessible by plant personnel, such as process control operators, maintenance personnel, configuration engineers, etc. In the example illustrated in FIG. 1, three user interfaces 16 are shown as being connected to two separate process control/safety control nodes 18 and 20 and to a configuration database 21 via a common communication line or bus 22. The communication network 22 may be implemented using any desired bus-based or non-bus based hardware, using any desired hardwired or wireless communication structure and using any desired or suitable communication protocol, such as an Ethernet protocol.

Generally speaking, each of the nodes 18 and 20 of the process plant 10 includes both process control system devices and safety system devices connected together via a bus structure that may be provided on a backplane into which the different devices are attached. The node 18 is illustrated in FIG. 1 as including a process controller 24 (which may be a redundant pair of controllers) as well as one or more process control system input/output (I/O) devices 28, 30 and 32 while the node 20 is illustrated as including a process controller 26 (which may be a redundant pair of controllers) as well as one or more process control system I/O devices 34 and 36. Each of the process control system I/O devices 28, 30, 32, 34 and 36 is communicatively connected to a set of process control related field devices, illustrated in FIG. 1 as field devices 40 and 42. The process controllers 24 and 26, the I/O devices 28-36 and the controller field devices 40 and 42 generally make up the process control system 12 of FIG. 1.

Likewise, the node 18 includes one or more safety system logic solvers 50, 52, while the node 20 includes safety system logic solvers 54 and 56. Each of the logic solvers 50-56 is an I/O device having a processor 57 that executes safety logic modules 58 stored in a memory and is communicatively connected to provide control signals to and/or receive signals from safety system field devices 60 and 62. Additionally, each of the nodes 18 and 20 includes at least one message propagation device (MPD) 70 or 72, which are communicatively coupled to each other via a ring type bus connection 74. The safety system logic solvers 50-56, the safety system field devices 60 and 62, the MPDs 70 and 72 and the bus 74 generally make up the safety system 14 of FIG. 1.

The process controllers 24 and 26, which may be, by way of example only, DeltaV™ controllers sold by Fisher-Rosemount Systems, Inc., or any other desired type of process controllers are programmed to provide process control functionality (using what are commonly referred to as control modules) using the I/O devices 28, 30 and 32 (for the controller 24), the I/O devices 34 and 36 (for the controller 26) and the field devices 40 and 42. In particular, each of the controllers 24 and 26 implements or oversees one or more process control routines stored therein or otherwise associated therewith and communicates with the field devices 40 and 42 and the workstations 14 to control the process 10 or a portion of the process 10 in any desired manner. The field devices 40 and 42 may be any desired types of field devices, such as sensors, valves, transmitters, positioners, etc., and may conform to any desired open, proprietary or other communication or programming protocol including, for example, the HART or the 4-20 ma protocol (as illustrated for the field devices 40), any fieldbus protocol such as the Foundation Fieldbus protocol (as illustrated for the field devices 42), or the CAN, Profibus, the AS-Interface protocols, to name but a few. Similarly, the I/O devices 28-36 may be any known types of process control I/O devices using any appropriate communication protocol(s).

The safety logic solvers 50-56 of FIG. 1 may be any desired type of safety system control devices include a processor 57 and a memory that stores safety logic modules 58 adapted to be executed on the processor 57 to provide control functionality associated with the safety system 14 using the field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4-20 ma protocol, while the safety field devices 62 are illustrated as using a bus communication protocol, such as a Fieldbus protocol.

A common backplane 76 (indicated by a dotted line through the controllers 24, 26, the I/O devices 28-36, the safety logic solvers 50-56 and the MPDs 70 and 72) is used in each of the nodes 18 and 20 to connect the controllers 24 and 26 to the process control I/O cards 28, 30 and 32 or 34 and 36, as well as to the safety logic solvers 52, 54 or 56 and 58 and to the MPDs 70 or 72. The controllers 24 and 26 are also communicatively coupled to, and operate as a bus arbitrator for the bus 22, to enable each of the I/O devices 28-36, the logic solvers 52-56 and the MPDs 70 and 72 to communicate with any of the workstations 16 via the bus 22.

As will be understood, each of the workstations 16 includes a processor 77 and a memory 78 that stores one or more configuration and/or viewing applications adapted to be executed on the processor 78. A configuration application 80 and a viewing application 82 are illustrated in an exploded view in FIG. 1 as being stored in one of the workstations 14. However, if desired, these applications could be stored and executed in different ones of the workstations 14 or in other computers associated with the process plant 10. Generally speaking, the configuration application 80 provides configuration information to a configuration engineer and enables the configuration engineer to configure some or all elements of the process plant 10 and to store that configuration in the configuration database 21. As part of the configuration activities performed by the configuration application 80, the configuration engineer may create control routines or control modules for the process controllers 24 and 26, may create safety logic modules for any and all of the safety logic solvers 50-56 and may download these different control and safety modules to the appropriate ones of the process controllers 24 and 26 and the safety logic solvers 50-56 via the bus 22 and controllers 24 and 26. Similarly, the configuration application 80 may be used to create and download other programs and logic to the I/O devices 28-36, any of the field devices 40, 42, 60 and 62, etc.

Conversely, the viewing application 82 may be used to provide one or more displays to a user, such as to a process control operator, a safety operator, etc., which includes information about the state of the process control system 12 and the safety system 14 either in separate views or in the same view, if so desired. For example, the viewing application 82 may be an alarm display application that receives and displays indications of alarms to an operator. If desired, such an alarm viewing application may take the form as disclosed in U.S. Pat. No. 5,768,119 entitled "Process Control System Including Alarm Priority Adjustment" and U.S. patent application Ser. No. 09/707,580 entitled "Integrated Alarm Display in a Process Control Network", both of which are assigned to the assignee of this patent and are hereby expressly incorporated by reference herein. It will be understood, however, that the alarm display or alarm banner of these patents may receive and display alarms from both the process control system 12 and the safety system 14 in an integrated alarm display as the alarms from both systems 12 and 14 will be sent to the operator workstation 14 executing the alarm display application and will be recognizable as alarms from different devices. Likewise, an operator may deal with safety alarms displayed in an alarm banner in the same manner as process control alarms. For example, the operator or user may acknowledge safety alarms, turn off safety alarms, etc. using the alarm display, which will send messages to the appropriate process controller 24, 26 within the safety system 14 using communications over the bus 22 and the backplane 76 to take the corresponding action with respect to the safety alarm. In a similar manner, other viewing applications may display information or data from both the process control system 12 and the safety system 14 as these systems use the same types and kinds of parameters, security and referencing so that any data from one of the systems 12 and 14 can be integrated into a display or view traditionally provided for a process control system.

In any event, the applications 80 and 82 may send separate configuration and other signals to and may receive data from each process controllers 24 and 26 as well as from each of the safety system logic solvers 50-56. These signals may include process-level messages related to controlling the operational parameters of the process field devices 40 and 42, and may include safety-level messages related to controlling the operational parameters of the safety-related field devices 60 and 62. While the safety logic solvers 50-56 may be programmed to recognize both the process-level messages and the safety-level messages, the safety logic solvers 50-56 are capable of distinguishing between the two types of messages and will not be capable of being programmed or effected by process-level configuration signals. In one example, the programming messages sent to the process control system devices may include certain fields or addresses which are recognized by the safety system devices and which prevent those signals from being used to program the safety system devices.

If desired, the safety logic solvers 50-56 may employ the same or a different hardware or software design as compared to the hardware and software design used for the process control I/O cards 28-36. However, the use of alternate technologies for the devices within the process control system 12 and devices within the safety system 14 may minimize or eliminate common cause hardware or software failures.

Furthermore, the safety system devices, including the logic solvers 50-56 may employ any desired isolation and security techniques to reduce or eliminate the chances of unauthorized changes being made to the safety-related functions implemented thereby. For example, the safety logic solvers 50-56 and the configuration application 80 may require a person with a particular authority level or a person located at a particular workstation to make changes to the safety modules within the logic solvers 50-56, with this authority level or location being different from the authority or access level or location needed to make changes to the process control functions performed by the controllers 24 and 26 and the I/O devices 28-36. In this case, only those persons designated within the safety software or located at workstations authorized to make changes to the safety system 14 have authorization to alter safety-related functions, which minimizes the chances of corruption to the operation of the safety system 14. As will be understood, to implement such security, the processors within the safety logic solvers 50-56 assess the incoming messages for proper form and security and operate as gatekeepers on changes being made to the safety-level control modules 58 executed within the safety logic solvers 50-56.

Furthermore, if desired, once safety-related functions are enabled within the logic solvers 50-56, no change of status to the safety functions can be made via the operator workstations 14 without proper access rights, which enables the communication structure associated with the process control system 12 to be used to provide initialization for the safety system 14 and to be used to provide run-time reporting of the operation of the safety system 14, but to still isolate the process control system 12 from the safety system 14 in the sense that changes to the process control system 12 cannot impact the operation of the safety system 14.

As will be understood, the use of the backplane 76 in each of the nodes 18 and 20 enables the safety logic solvers 50 and 52 and the safety logic solvers 54 and 56 to communicate locally with one other to coordinate safety functions implemented by each of these devices, to communicate data to one another, or to perform other integrated functions. On the other hand, the MPDs 70 and 72 operate to enable portions of the safety system 14 that are disposed at vastly different locations of the plant 10 to still communicate with one another to provide coordinated safety operation at different nodes of the process plant 10. In particular, the MPDs 70 and 72 in conjunction with the bus 74 enable the safety logic solvers associated with different nodes 18 and 20 of the process plant 10 to be communicatively cascaded together to allow for the cascading of safety-related functions within the process plant 10 according to an assigned priority. Alternatively, two or more safety-related functions at different locations within the process plant 10 may be interlocked or interconnected without having to run a dedicated line to individual safety field devices within the separate areas or node of the plant 10. In other words, the use of the MPDs 70 and 72 and the bus 74 enables a configuration engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10.

Figure 2:
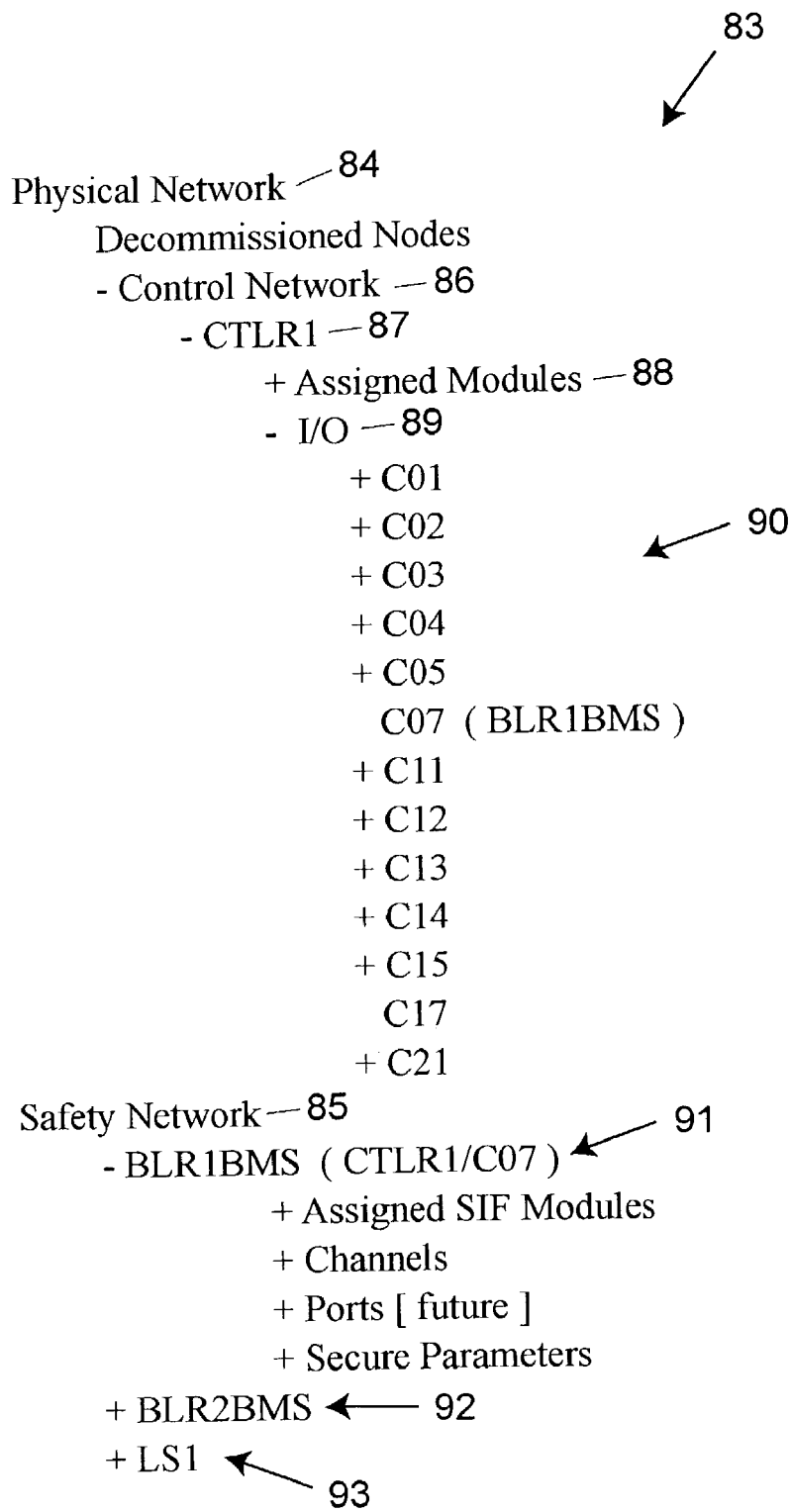
FIG. 2 is screen display generated by a configuration application in one of the workstations of FIG. 1 illustrating a configuration view of the process plant of FIG. 1 showing both process control system devices and safety system devices.

FIG. 2 illustrates a screen display 83 that may be generated by the configuration routine 80 of FIG. 1 depicting a configuration presentation having the safety system 14 (including the logic solvers and the safety field devices) integrated with the process control system 12. It will be understood that the configuration display screen 83 of FIG. 2 illustrates the manner in which the configuration application 80 has configured the software associated with the different devices within the process plant 10 and can be used by a configuration engineer to create or alter the current configuration of the process plant 10 by downloading new configuration software to the devices within the process plant 10, including the process control system devices and the safety system devices.

As illustrated in the screen display 83, the process plant 10 includes a physical network section 84 which is used for displaying the physical interconnections of the devices within the process plant 10 and a safety network section 85 which is used for configuring safety system devices. The physical network section 84 includes a control network section 86 having a controller 87 (named CTRLR1). The controller 87, which may be one of the controllers of FIG. 1, includes a set of assigned modules 88 which are control modules stored in and executed by the controller 87 and an I/O devices section 89 connected to the controller 87 for communication purposes. The I/O devices section 89 is expanded to illustrate all of the cards 90 connected to the controller 87 (CTLR1) via one of the backplanes 76 of FIG. 1. In this example, I/O devices section 89 includes process control input/output cards C01-C05, C11-C15 and C21. Each of these cards may be expanded to illustrate the identity of and other information associated with the different field devices (which are individual ones of the field devices 40 an 42 of FIG. 1) connected to each of these cards. Similarly, for illustration of the physical connections, two safety system cards C07 (named BLR1BMS) and CO17 (not yet configured). These cards are illustrated in a shaded format and cannot be expanded in this section because they cannot be configured in or by the control network. However, as will be understood, the devices associated with the process control system 12 can be configured using the control network section 86 of the screen 83 by adding, deleting, or changing control modules, I/O devices and/or field devices, to the configuration presentation.

The safety system 12 is illustrated in the safety network section 85 of the screen 83 as including three safety logic solvers 91-93 named BLR1BMS, BLR2BMS and LS1. Likewise, if desired, message propagation devices (such as the MPDs 70 and 72 of FIG. 1) may be illustrated in the safety network section 85. In the screen 83, the safety logic solver 91 is expanded to illustrate that it includes assigned safety modules, one or more channels (which are connected to safety field devices such as the devices 60 and 62 of FIG. 1) and secure parameters. Each of these elements could be further viewed, added to, deleted or changed in this section of the screen 83 to thereby configure the safety system 14. In particular, the safety system 14 can be configured and modified using the safety network section 85 in a manner similar to the manner of configuring the process control network 14 using the control network section 86. In fact, as will be understood, control or safety modules can be created and assigned to each of these different control and safety systems using the method for configuring a process control system as described in U.S. Pat. No. 5,838,563 which is assigned to the assignee of this patent and which is hereby expressly incorporated by reference herein. Generally speaking, however, safety logic modules can be created from module template objects stored in a configuration library and adapted so as to be used in a particular safety logic solver to perform safety functions with respect to particular safety field devices within the process plant 10. To create a safety logic module, a safety engineer may copy a particular control template (which may be used to create both process control modules run in process controllers as well as safety logic modules run in safety logic solvers) to create a particular safety logic module and may assign that safety logic module to a particular safety element, such as to one of the safety logic solvers, by dragging and dropping that safety logic module under an indication of the safety logic solver within the configuration display screen 83 of FIG. 2. In implementing the disclosed system, a new user role of safety engineer is created. When configuring the safety system, the configuration engineer who manages the process control portion may not have the appropriate privileges to configure safety modules, and thus configuration of the safety modules will be carried out by the safety engineer. Thus, security within the system will allow for the delineation of separate safety engineers and process configuration engineers.

In one particular example, a safety engineer may add safety logic solvers under the safety network section 85 by selecting an Add Logic Solver menu option (not shown) from a safety network menu (which may be a pop-up or a pull down menu, for example). At this time, a logic solver having the next available system name is created under the safety network 85. Automatically created system names may start with, for example, LS1 but can be renamed to any globally unique name within the configuration system for the process plant 10. FIG. 2 illustrates the case in which two logic solvers have been renamed and one (LS1) has not been renamed. At this point the logic solver is a still a placeholder, not bound to a physical logic solver. Thereafter, the user can drag and drop a logic solver from under the physical network section 84 onto the safety network section 85 to bind a particular physical logic solver to the created placeholder. Once a particular logic solver under the safety network section 85 is bound, configuration changes made to that logic solver will be performed on and downloaded to the specified physical logic solver as specified under the physical network section 84. Furthermore, once bound, the logic solver under the safety network section 85 may show the physical path in parentheses and the logic solver under the physical network section 84 may show the logic solver name in parentheses. The safety logic device 91 and the card CO7 are bound together in this manner in FIG. 2.

If desired, binding may also be performed by dragging an unbound logic solver under the safety network section 85 to an unbound logic solver under the physical network section 84 or an unbound logic solver under the physical network section 84 may be dragged and dropped under the safety network section 85. In either case, binding a placeholder to a physical logic solver results in a reference shown in parentheses. Of course, dragging and dropping a placeholder under the safety network section 85 to I/O under a controller in a control network section is not supported so that it is not possible to create a logic solver card under a process controller I/O device. This provides functional separation between the process control devices and the safety devices.

Of course, lower level safety elements, such as safety field devices, safety modules, parameters, etc. may be assigned to or bound to a particular safety logic solver by placing an indication of these lower level elements in the proper location of the screen display 83.

Figure 3:
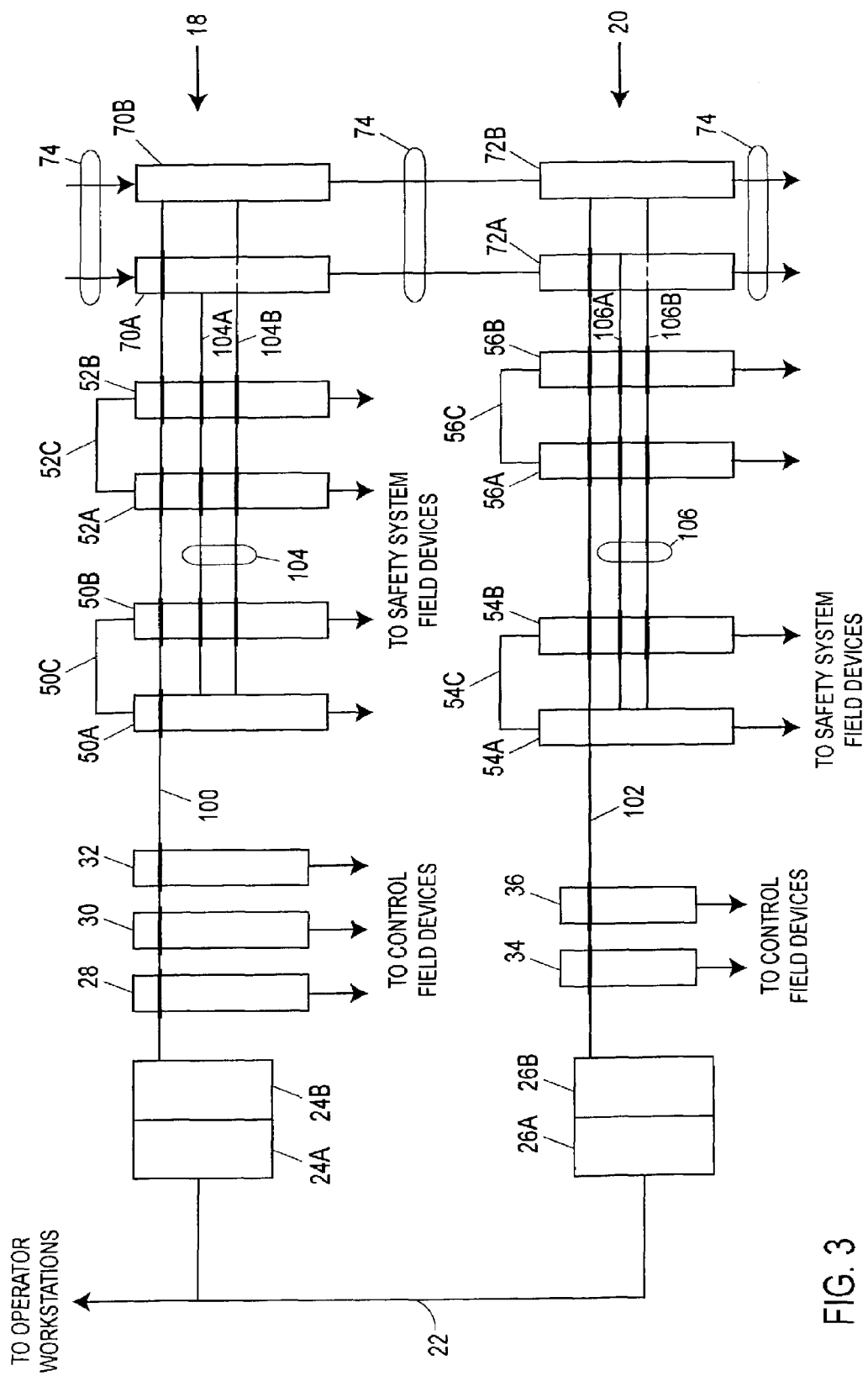
FIG. 3 is a block diagram of multiple safety system controllers communicatively connected with one another via a first communication network and additionally connected with process control system controllers and operator interfaces via a second and common communication network.

FIG. 3 illustrates the communication connections within and between the nodes 18 and 20 of the process plant 10 in more detail. Generally speaking, the components of FIG. 1 that are illustrated in FIG. 3 are referred to the by same reference numerals. However, each of the controllers 24 and 26 is illustrated in FIG. 3 as a redundant controller pair 24A, 24B and 26A and 26B which may use any standard redundancy techniques. Likewise, each of the safety logic solvers 50-56 is illustrated as a pair of devices having a primary safety logic solver 50A, 52A, 54A, and 56A and a secondary safety logic solver 50B, 52B, 54B and 56B in each pair. As will be understood, each of the pair of safety logic solvers 50-56 is connected to safety field devices (not illustrated in FIG. 3) and may store the same safety logic modules 58 for use in performing safety functions within the safety system 14. Each pair of safety logic solvers 50-56 includes a dedicated bus 50C, 52C, 54C and 56C connected between the primary and secondary logic solvers to provide control communications between the logic solver pair. The primary and secondary safety logic solvers preferably are running and performing calculations at the same time, and the outputs of these two devices may be communicated to each other and confirmed via the appropriate buses 50C, 52C, 54C and 56C. If desired, the primary device may include voting logic that determines the output of the pair of safety logic solvers based on the output of both of the primary and secondary devices. Alternatively, any desired or known redundancy techniques may be used for the pairs of logic solvers 50-56. Moreover, each of the MPDs 70 and 72 is illustrated as a redundant pair of devices 70A, 70B and 72A, 72B with the MPDs of the different nodes 18 and 20 being connected with a redundant pair of inter-node communication lines or buses 74. While the communication interconnections between only two nodes 18 and 20 are illustrated in FIGS. 1 and 3, it will be understood a single or a redundant pair of MPDs may be located in any number of different nodes of the process plant 10 and may be connected with each other in a ring type bus structure to provide inter-node communications in any desired manner. Because a ring bus communication structure is generally (although not necessarily) used, the MPDs of the first node will be connected to the MPDs of the second node, which will be connected to the MPDs of the third node, and so on, with the MPDs of the last node being connected to the MPDs of the first node, all via the ring bus 74. If only two nodes exist in the process plant 10, such as illustrated in FIG. 1, the bus 74 coming out of the MPDs 72A and 72B of the node 20 will be connected directly to the inputs of the MPDs 70A and 70B of the node 18.

In addition to illustrating the connection between the controllers 24 and 26 and the workstations of FIG. 1, FIG. 3 illustrates the backplanes 76 in more detail. In particular, at the node 18, the controllers 24A and 24B are connected to the I/O devices 28, 30 and 32, to the redundant pairs of safety logic solvers 50A, 50B and 52A, 52B and to the redundant pair of the MPDs 70A and 70B via a railbus communication connection 100 which is preferably disposed in the backplane 76. In the same manner, at the node 20, the controllers 26A and 26B are connected to the I/O devices 34 and 36, to the pairs of safety logic solvers 54A, 54B and 56A, 56B and to the redundant pair of the MPDs 72A and 72B via a railbus communication connection 102 disposed in the backplane 76. The controllers 24 and 26 use the railbus connections 100 and 102 to provide communications between the workstations 14 on the one hand and the I/O devices 28, 30, 32, 34 and 36 and the safety system logic solvers 50, 52, 54, 56, 70 and 72 on the other hand, as well as to provide communications between the I/O devices 28, 30, 32, 34 and 36 on the one hand and the safety system logic solvers 50, 52, 54, 56, 70 and 72 on the other hand. In other words, the railbus lines 100 and 102 are used as the communication network that enables the safety system devices to be integrated with the process control system devices at a higher level within the process plant 10 so that the same configuration applications and display applications disposed within the workstations 14 may communicate with, configure and display information from both the process control system devices and the safety system devices.

Additionally, as illustrated with respect to the node 18, the backplane 76 includes a primary peer-to-peer (P2P) bus 104A that connects each of the safety system logic solvers 50 and 52 to the primary MPD 70A while a secondary P2P bus 104B connects each of the safety system logic solvers 50 and 52 to the secondary MPD 70B. The primary and secondary P2P buses 104A and 104B are local P2P buses which provide local communications between the safety logic solvers within a single backplane 76 as well as to the MPD 70 associated with or connected to that backplane 76. In a similar manner, the node 20 includes a primary peer-to-peer (P2P) bus 106A that connects each of the redundant pairs of safety system logic solvers 54 and 56 to the primary MPD 72A while a secondary P2P bus 106B connects each of the redundant pairs of safety system logic solvers 54 and 56 to the secondary MPD 72B. The primary and secondary P2P buses 106A and 106B are local P2P buses that provide local communications between the safety logic solvers and the MPD 72 within the backplane 76 of the node 20. As will be understood, the local primary and secondary P2P buses 104A, 104B, 106A, 106B provide redundant communication paths between all the safety related logic solvers 50-56 on the respective backplanes 76. If desired, the local P2P buses 104 and 106 may operate as broadcast buses, in that each safety logic solver and MPD device connected to the bus receives the transmissions of all the other devices on that bus, and only one device can transmit at a time. Of course, while FIG. 3 illustrates two safety logic solvers connected to each of backplanes 76 in the different nodes 18 and 20, any desired number of safety logic solvers, which may be redundant pairs of logic solvers or stand-alone logic solvers, may be connected to the backplane 76 (and thereby connected to the local P2P bus 104 or 106) at each of the nodes 18 and 20.

If desired, the safety logic solvers may share the local P2P bus media using a time division multiple access (TDMA) methodology in which all the local safety logic solvers on a particular backplane are synchronized with each other. In one case, the local P2P buses 104 and 106 may use an RS485 Manchester encoded HDLC protocol with a throughput of, for example, 2 Mb/sec. This Manchester encoding scheme causes the wire to be driven at 4 Mb/s. The given rates are exemplary only, as other suitable rates and encoding schemes may be chosen as well. Furthermore, if desired, each of the local safety logic solvers on a particular backplane may determine or be assigned its transmission time slot within the TDMA scheme used on the backplane 76 based on its physical location in the backplane 76, which reduces the number of configuration steps needed to set up the backplane 76 at a particular node. Still further, the primary and secondary P2P buses 104 and 106 of the backplanes 76 may support any desired message types and the physical interconnections for the local P2P buses 104 and 106 may reside within the backplane 76.

The remote P2P buses 74 preferably use a ring topology to allow data to be communicated between safety logic solvers located at different nodes of the process plant 10 and, therefore, disposed on different backplanes 76. The MPDs 70 and 72 are responsible for propagating messages around the ring made up by the remote P2P bus 74, for placing messages directed from a safety logic solver on the same backplane as the MPD 70 or 72 to the ring 74 and for forwarding the messages which are on the ring 74 and addressed to a safety logic solver on the same backplane as an MPD 70 or 72 to that safety logic solver. While any number of messages may be propagated on the remote P2P bus 74, one embodiment provides a maximum of thirty two (32) messages to be propagated during any P2P bus cycle. These messages can originate from 1 to 32 separate and distinct safety logic solvers, including the safety logic solvers 50-56 on the backplanes 76 of the nodes 18 and 20, as well as any other backplanes at other nodes in the process plant 10 interconnected by the ring bus 74. As a result of this operation, however, all of the safety logic solvers in the safety system 14 may operate synchronously, even when they are located at different nodes, because the ring bus 74 provides a communication interconnection between these devices which enables synchronization to be accomplished. The ring bus 74 may use and desired type of bus structure and protocol, but preferably uses point-to-point fiber optic cables and a 10BaseT Ethernet protocol, which has a throughput of about 10 Mb/s.

Figure 4:
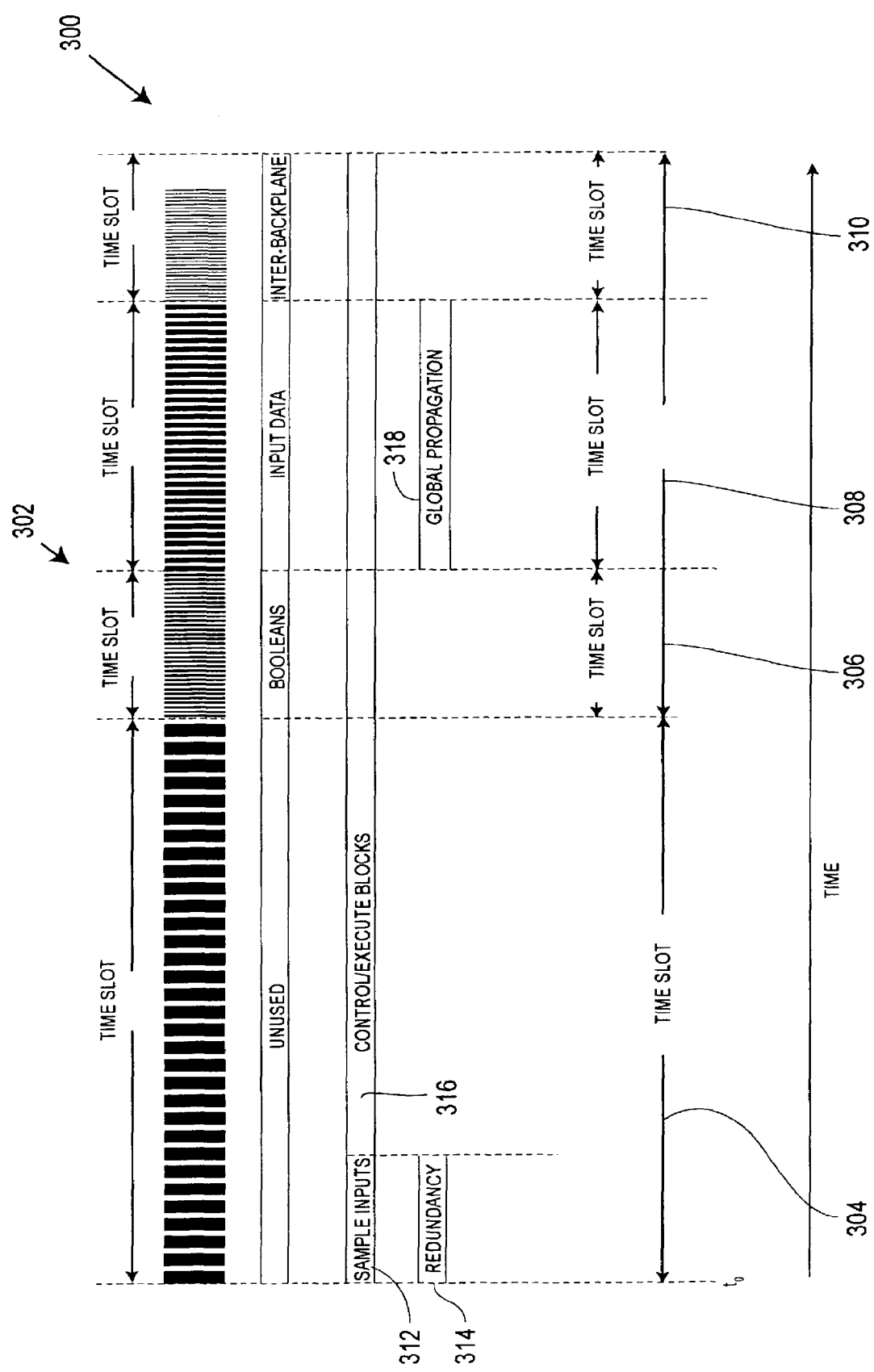
FIG. 4 is a schematic diagram illustrating a bus cycle of a local peer-to-peer bus used in the safety system of FIGS. 1 and 3.

FIG. 4 depicts a timing diagram 300 for a single bus cycle 302 used on the local P2P buses 104 or 106, illustrating an exemplary timing sequence for the manner in which P2P messages are sent over the P2P bus 104 or 106 relative to other activities in the safety system 14. The bus cycle 302 reflects a suitable bus cycle time frame or bus cycle period, and is divided into a suitable number of individual time slots, with each individual time slot being of a selected length. Alternatively, all of the individual time slots may be of the same fixed length. One of skill in the relevant art will readily be able to select a suitable bus cycle period and appropriate time intervals for the individual time slots depending on the communication protocol employed and on other known design considerations. Similarly, other types of bus communications besides TDMA communications could be used on the P2P busses 104 and 106 if so desired.

Generally speaking, the bus cycle 302 of FIG. 4 is divided into a number of discrete time blocks. In accordance with the disclosed example, there are four time blocks 304, 306, 308 and 310, each with various numbers of time slots having various lengths. In the bus cycle 302 of FIG. 4, the time block 304 includes a suitable number of individual time slots, with each time slot having a suitable length. Similarly, the time blocks 306, 308 and 310 each includes a suitable number of individual time slots, with the time slots of the time blocks 306, 308 and 310 each having a suitable length. The number and length of the individual time slots within each of the time blocks 304, 306, 308 and 310 may be chosen based on the details of the communication protocol chosen by the end user of the system 11. Generally speaking, the time slots allocated to the time block 304 are not used to send any particular communications over the P2P bus 104 or 106. However, during a portion 312 of the time block 304, the logic solvers on the bus 104 or 106 perform input sampling (i.e., sampling inputs from the field devices 60 and 62 connected thereto) and then execute the safety logic control algorithms or modules within the safety logic solvers. Of course, because these activities do not use the P2P busses 104 or 106, any message types may be allocated to the time block 304 as long as these message types do not interfere with the sampling and safety control activities taking place during this time period. In any event, as indicated in FIG. 4, a time portion 314 may be used to send synchronization signals between redundant pairs of safety logic solvers using, for example, the lines 50C, 52C, 54C and 56C of FIG. 3. Also, during a time period 316, the individual safety logic modules within the safety logic solvers on the busses 104 and 106 are executed and the outputs of these safety modules are calculated and set.

During the time block 306, the safety logic solvers on the bus 104 or 106 transmit a set of Boolean data values. The Boolean data values are generated by the individual logic solvers and will preferably be a digital signal indicating a result of logic performed in the logic solvers. In the disclosed example, such a digital signal may be particularly appropriate for safety-related shut-off messages typically employed in the safety system 11. In particular, each safety logic solver is provided one or more time slots during the block time period 306 to perform this activity and each of the other safety logic solvers and the MPD devices on the bus 104 or 106 receive these Boolean data transmissions.

During the third time block 308, the safety logic solvers transmit their raw I/O data values over the local P2P bus 104 or 106 in assigned time slots. Once again, each of the other local safety logic solvers on the corresponding backplane 76 receives these transmissions, while MPDs ignore these transmissions. However, if the MPD on the bus 104 or 106 has received a Boolean message with a global destination address (i.e., a destination address located on a different backplane associated with a different node of the process plant 10), the MPD packages the message with other such global messages and forwards the global messages to the next MPD over the global P2P bus 74 during the time period 318. During this process, the MPDs also forward (to the next MPD in the ring 74) any messages received from other MPDs located previously in the ring. An MPD will stop forwarding a message when it see data values that originated locally.

During the time block 310, the MPD propagates global messages (messages coming to the MPD from other remote backplanes via the bus 74) which are addressed to the local safety logic solvers to those safety logic solvers via the bus 104 or 106. Because these global messages have previously been packaged into a single message by the MPD on the remote backplane, a single and relatively large time slot may be required.

As will be understood, the MPDs are responsible for propagating global Boolean messages from the safety logic solvers on each backplane to other ones of the safety logic solvers on different backplanes using the ring bus 74. However, the MPDs can also be used to monitor communication activity on the local P2P buses 104 and 106, the remote P2P buses 74, and the transmit or receive portion of the corresponding railbuses 90. If desired, the primary MPD (for example, 70A or 72A) is connected to the corresponding primary local P2P bus 104A or 106A, to the primary remote P2P bus 74A and to the transmit side of the corresponding railbuses 90 and 92. Alternatively, the secondary MPDs 70B and 72B are connected to the corresponding secondary local P2P buses 104B and 106B, respectively, to the secondary remote P2P bus 74B and to the receive side of the railbuses 90 and 92. Thus, the MPDs can monitor all activity on the railbuses 90 and 92 and on the local and remote P2P buses

104, 106 and 74. If desired, the MPDs may collect and timestamp all messages before sending the messages out on, for example, the bus 74 using a 10BaseT Ethernet monitor port. An external Ethernet packet sniffer can be used to capture and visualize all communications coming from the monitor port. In one example, each of the backplanes 76 may support thirty two (32) safety-related I/O cards and two (2) Message Propagation Devices (MPDs).

The source address for the various safety logic devices and MPDs may be derived from railbus messages and may be made up of a backplane ID (BPID), which is the same at each node but unique within the process plant 10, and a slot ID (SID), which may be repeated from node to node but is unique within a node. Also, the safety logic solvers may derive their broadcast time slots (relative to other devices) in the local P2P bus 104 or 106 from their SID. If desired, the backplanes at different nodes may be synchronized to within 10 ms of each other.

Preferably, messages over the remote P2P bus 74 are transmitted in the order they are received and are sent as a group only during the input data portion 308 of a P2P bus communication cycle. If desired, the safety logic servers in adjacent slots, for example, the logic solvers 50A and 50B can automatically be configured, based on their position within the backplane 76, to be redundant and to be the primary or secondary redundant device. The redundancy bus 50C, 52C, etc. may be disposed within the backplane 76 to connect the pair of redundant devices. Generally speaking, the active or primary safety logic solver transmits the global Boolean messages, if configured to do so, while the secondary or standby safety logic solver of the redundant pair does not transmit global Boolean messages so that the MPDs will only propagate global Boolean messages from the primary or active safety logic server. Of course, the secondary or standby safety logic solver within a redundant pair obtains its configuration from the active or primary safety logic solver via the redundancy link 50C, 52C, 54C or 56C. The standby obtains its Boolean and I/O data from the active device via the P2P link 104 or 106. In the event of a failover (switching between the active and the standby safety logic solver), the newly activated safety logic solver will begin broadcasting in the same time slot on the local P2P bus 104 or 106 as the formerly used by the failed active device. If the active safety logic solver fails to transmit for a particular number of time slots, the standby safety logic solver may automatically take over as the active safety logic server, but, in this case, the new active safety logic solver will broadcast in its own local time slot, not the time slot of the formerly active safety logic solver.

The following methodology may be used to synchronize the safety logic solvers connected to a local P2P bus 104 or 106. First, the devices are provided with power and the BPID and SID from controller device (which manages the railbus 90 or 100) are assigned. Next, the logic solvers begin receiving and parsing packets from the P2P bus 104 or 106 using time slots as defined by the SID. This activity is performed for a "wait to transmit" number of seconds, which may be calculated as:

Wait to transmit (secs)=((64)(time slot duration))+
((my time slot−1)(time slot duration))

If no P2P bus packets are received before the "wait to transmit" seconds have elapsed, then the safety logic solver immediately transmits a "NOT CONFIGURED" message on the local P2P bus 104 or 106. However, if the safety logic sever receives one or more packets during the "wait to transmit" time, it uses the time and time slot of these messages to determine the relative position (in time) of its own transmission time slot.

Generally speaking, the MPDs on a backplane will synchronize to the local P2P bus 104 or 106. However, in the absence of a local safety logic solver which provides this synchronization, the MPD will not transmit on the local P2P bus and will synchronize with the local bus only after a local safety logic solver begins broadcasting. Once the MPD receives a message from a local safety logic solver, it can determine its time slot relative to the safety logic solver.

Although the embedded safety system may employ any one of a number of possible message structures or communication protocols, the following message structures may be employed on the local P2P busses 104 and 106 and on the remote P2P bus 74.

All local P2P bus messages generally include three fundamental portions including a preamble, (e.g., 1-byte) data or message portion (e.g., 129-bytes) and a postamble (e.g., 1-byte). The preamble and postamble portions are provided for hardware synchronization while the data portion contains the actual message that has meaning to a given addressee. If desired, hardware bit insertion may occur within the message portion of the high-level message structure.

Generally speaking, the data or message portion of a message is divided into seven fields with a total length of up to a maximum available length for a given application. For example, there be may 138 available bytes (including 11 bytes of protocol overhead). The message portion may include a 2-byte source address, a 2-byte destination address, a 1-byte type field, a 1-byte device status field, a 1-byte length field, a 0- to 128-byte message field, and a 4-byte CRC field which provides cyclical redundancy data.

For example, in one manner of using these fields, the source address field contains the address of the sending device. The higher-order byte contains the backplane ID (BPID) and the lower-order byte contains the slot ID (SID). Until the safety logic solver has a configured SOURCE ADDRESS, it cannot transmit or receive on the local P2P bus. At power-up, each safety logic solver obtains its complete SOURCE ADDRESS from the controller via the railbus. The backplane ID (BPID) portion of the SOURCE ADDRESS is set equal to right-most octet of the controller's IP address. The slot ID (SID) portion of the SOURCE ADDRESS is derived from the controller's railbus messages. Preferably, each safety logic solver does not communicate (transmit or receive) on the local P2P until it has a complete SOURCE ADDRESS.

The DESTINATION ADDRESS field contains the address of the destination device. The higher-order byte contains the BPID and the lower-order byte contains the SID. When the HB=0 and the LB=0, the message is meant for all remote and local safety logic solvers on the bus. When the HB=BPID and the LB=0, the message is meant for all nodes on the local backplane. When the HB=BPID and the LB=0, the message is meant for a particular SID on local backplane. Finally, when the HB=0 and the LB=0, an illegal address is indicated.

The message TYPE filed contains information regarding the type of message contained within the message date field. A number of different message types may be defined.

The DEVICE STATUS filed may suitably divided so as to indicate, for example, the diagnostic status (indicating no error or error), the switch over status (indicating not in progress or in progress), the controller mode (indicating normal mode or engineering mode), the safe trip status (indicating not tripped or tripped), the redundant status (indicating not redundant or redundant), the configured status (indicating not configured or configured), the controller type (determined by the logic solver, and indicating standby or active), and the mode (the mode value comes from the controller via the bus, and indicates engineering mode or normal mode).

The LENGTH field contains the length, in butes, of the upcoming MESSAGE DATA filed, and is message dependent.

The MESSAGE DATA field is the payload of the message formatted according to the message TYPE, and having a length dependent on the message.

Finally, the CRC or Cyclic Redundancy Check/Code field is calculated from the SOURCE ADDRESS, TYPE, DEVICE STATUS, LENGTH, and MESSAGE DATA fields, and also is message dependent.

In the disclosed example, remote P2P bus messages can only be sent between MPDs. Generally speaking, all remote P2P bus messages are encapsulated within the DATA portion of an Ethernet IEEE 802.3 Protocol packet which includes, for example, a 7-byte preamble, a 1-byte frame start delimiter, a 6-byte destination address, a 6-byte source address, a 2-byte type/length field, a 46- to 1500-byte data field and a 4-byte frame check sequence field.

As is known, the frame begins with a 7-byte preamble of alternating ones and zeros. When the frame is Manchester encoded, the preamble gives the receiving stations a known pattern on which to lock. The frame start delimiter follows the preamble, signifying the beginning of the frame. The destination and source addresses are each generally irrelevant as the receivers will be listening in promiscuous mode.

The Ethernet TYPE field/IEEE 802.3 LENGTH field signifies the protocol used in the rest of the frame and the length field specifies the length of the data portion of the frame. For Ethernet and IEEE 802.3 frames to coexist on the same LAN, the length field of the frame must always be different from any type fields used. This fact limits the length of the data portion of the frame to 1,500 bytes and the total frame length to 1518 bytes. For the safety logic solver application, the type will be Ethernet and the length of the data field will be the size of the messages. The data field contains the P2P message being sent by a safety logic solver. Messages whose data length is less than 46 bytes will be padded. As is known, the 4 bytes of the frame check sequence field is a standard 43-bit CCITT-CRC polynomial.

If desired, the data portion of the high level message structure is divided into three fields with a total length of up to a maximum of 551 bytes (including 6 bytes of protocol overhead). Moreover, the low-level message structure allows for 256 message types. The type field uniquely identifies each message type and message type has a corresponding value for the length field, which specifies the length of the data portion of each message. The message types may be encapsulated Boolean data, with any number of 1-32 Boolean data messages encapsulated within the overall message. Of course, other types of messages could be sent as well, if so desired.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control system having an embedded safety network comprising:

a host computer arranged to send and receive process control messages and safety messages;
  a first communication network;
  a controller operatively connected to the host computer by the first communication network for performing process control functionality; and
  a plurality of input/output (I/O) cards operatively connected to the controller via a second communication network, the plurality of I/O cards including:
    a first I/O card for operative communication with a first process control related field device; and
    a second I/O card for operative communication with a safety-related field device, the second I/O card including a processor that executes a safety module for implementing safety functionality apart from the process control functionality using the safety-related field device.

2. The process control system of claim 1, including a third I/O card, the third I/O card for operative communication with a second safety-related field device, the third I/O card including a second processor that executes a second safety module for implementing the safety functionality using the second safety-related field device.

3. The process control system of claim 2, wherein the second and third I/O cards are connected by a local communication bus for communicating safety messages between the second and third I/O cards.

4. The process control system of claim 3, wherein the second and third I/O cards are operatively connected to a message propagation device on the local communication bus.

5. The process control system of claim 2, wherein the second and third I/O cards are operatively connected to primary and secondary message propagation devices via a primary and a secondary local communication bus.

6. The process control system of claim 2, wherein the second and third I/O cards are connected by a primary local communication bus and by a secondary local communication bus, each of the primary and secondary local communication buses communicating safety related messages between the second and third I/O cards.

7. The process control system of claim 2, wherein each of the second and third I/O cards is operatively connected to a message propagation device which is in operative communication with the second communication network.

8. The process control system of claim 1, wherein the second I/O card is operatively connected to a message propagation device which is in operative communication with the second communication network.

9. The process control system of claim 1, wherein the second I/O card is operatively connected to a primary and a secondary message propagation device, the primary and secondary message propagation devices being in operative communication with the second communication network.

10. The process control system of claim 9, wherein the primary and secondary message propagation devices are connected to the second I/O card via a redundant local communication link.

11. The process control system of claim 1, including a plurality of additional safety-related I/O cards, each of the additional safety-related I/O cards in operative communication with one of a plurality of additional safety-related field devices, each of the additional safety-related I/O cards including a processor for performing additional safety modules using a corresponding one of the additional safety-related field devices.

12. The process control system of claim 1, wherein the host computer includes an operator interface arranged to send re-programming signals to both the first I/O card and the second I/O card, the processor of the second I/O card programmed to evaluate the re-programming signals to determine if the re-programming signals are directed to the second I/O card.

13. The process control system of claim 1, wherein the host computer is arranged to communicate process-related reprogramming signals and safety-related reprogramming signals to the second communication network, and wherein the processor of the second I/O card is programmed to distinguish the process-related reprogramming signals from the safety-related reprogramming signals.

14. The process control system of claim 1, wherein the host computer includes a viewing application for receiving process control data from the first I/O card and safety data from the second I/O card and to display the process control data and the safety data in an integrated display to a user.

15. The process control system of claim 14, wherein the controller is arranged to generate alarm data associated with the process control data, the controller further arranged to generate alarm data associated with the safety data.

16. The process control system of claim 1, wherein the first I/O card has a first security level associated therewith used to enable the first I/O card to accept process control reprogramming signals from the host computer and wherein the second I/O card has a second security level associated therewith used to enable the second I/O card to accept reprogramming signals from the host computer, wherein the first and the second security levels are different security levels.

17. The process control system of claim 16, wherein the first and the second security levels are user identity based security levels.

18. The process control system of claim 17, wherein the first and the second security levels are location based security levels.

19. A safety system for use in a process plant, the safety system comprising:
 a first safety logic device communicatively connected to a first safety field device;
 a first safety logic module stored in and executed by the first safety logic device to perform first safety functionality using the first safety field device;
 a second safety logic device communicatively connected to a second safety field device;
 a second safety logic module stored in and executed by the second safety logic device to perform second safety functionality using the second safety field device;
 a first communication bus interconnecting the first and the second safety logic devices to enable the first and the second safety logic devices to communicate with one another; and
 a process controller communicatively connected to the first and second safety logic devices via a second communication bus and a user workstation communicatively coupled to the process controller via a third communication bus.

20. The safety system of claim 19, wherein the first safety logic device includes a primary redundant safety logic solver and a secondary redundant safety logic solver.

21. The safety system of claim 20, wherein the first communication bus includes a primary redundant communication bus and a secondary redundant communication bus.

22. The safety system of claim 19, wherein the first communication bus is provided in a backplane at a node of the process plant, and wherein the first and the second safety logic devices are attached to the backplane.

23. The safety system of claim 19, wherein the first and the second safety logic devices are disposed at a first node of the process plant, and further including a first message propagation device disposed at the first node of the process plant and coupled to the first communication bus to communicate with the first and the second safety logic devices, and including a third safety logic device disposed at a second node of the process plant, a third safety logic module stored in and executed by the third safety logic device to perform third safety functionality, a second message propagation device disposed at the second node of the process plant, a second communication bus interconnecting the third safety logic device and the second message propagation device at the second node of the process plant and a remote communication bus that connects the first message propagation device at the first node of the process plant and the second message propagation device at the second node of the process plant.

24. The safety system of claim 23, wherein the first and second communication busses use a time division multiplexing communication scheme.

25. The safety system of claim 24, wherein the first and second safety devices communicate local safety messages to each other via the first communication bus and at least one of the first and second safety devices sends remote safety messages to the third safety device via the first communication bus, the first message propagation device, the remote communication bus, the second message propagation device and the second communication bus.

26. The safety system of claim 23, wherein the remote communication bus is a ring bus.

27. The safety system of claim 23, further including a process controller communicatively connected to the first and second safety logic devices via a further communication network and a user workstation communicatively coupled to the process controller via a third communication network.

28. The safety system of claim 27, wherein the third communication network is an Ethernet bus.

29. The safety system of claim 27, further including a process control input/output device communicatively connected to the further communication network and one or more process control field devices connected to the process control input/output device.

30. The safety system of claim 19, further including a process control input/output device communicatively connected to the second communication network and one or more process control field devices connected to the process control input/output device.

31. A configuration system for use in a process plant having a safety network, a process control network and a user workstation communicatively coupled to the safety network and to the process control network via a shared communication network, the configuration system comprising:
 a computer readable memory;
 a configuration application stored on the computer readable memory and executed on a processor to;
 assign a safety module to a safety element within the safety network to perform a safety function;
 assign a process control module to a process control element within the process control network to perform a process control function; and
 download the safety module to the safety element and the process control module to the process control element via the shared communication network.

32. The configuration system of claim 31, wherein the configuration application enables a user to create the safety module.

33. The configuration system of claim 32, wherein the configuration application creates the safety module to communicate with other safety modules located in other safety elements at a same node of the process plant via a local bus connected between the safety element and the other safety elements but not connected to the process control element.

34. The configuration system of claim 33, wherein the safety element is at a first node of the process plant and wherein the configuration application creates the safety module to communicate with a remote safety module located in a remote safety element at a second node of the process plant via a remote bus connected between the first and the second nodes of the process plant.

35. The configuration system of claim 31, wherein the configuration application displays the safety element and the process control element in an integrated configuration view.

36. The configuration system of claim 35, wherein the configuration application displays the safety module as being associated with the safety element in the integrated configuration view.

37. The configuration system of claim 31, wherein the configuration application enables the user to create the safety module and to assign the safety module to the safety element by dragging the safety module to the safety element within the configuration view.

38. A safety logic module system for use in a safety network disposed in a process plant having a process controller communicatively coupled to one or more process control input/output devices which perform process control functions and to a safety logic solver via a first communication bus, with the safety logic solver connected to one or more safety field devices, the safety logic module system comprising:

a computer readable memory;
a safety logic module stored on the computer readable memory executed on a processor of the safety logic solver to;
perform a safety function with respect to the one or more safety field devices;
communicate via a second communication bus to another safety logic module within another safety logic solver connected to the first communication bus; and
communicate with the process controller and the process control input/output devices via the first communication bus.

39. The safety logic module system of claim 38, wherein the process plant includes a first message propagation device communicatively connected to the controller via the first communication bus at a first node and a second node having one or more safety logic solvers and a second message propagation device connected to the first message propagation device via a third communication bus and wherein the safety logic module communicates to the one or more safety logic solvers at the second node of the process plant via the message propagation devices and the third communication bus.

40. The safety logic module system of claim 38, wherein the safety logic module receives and reads process control messages from the controller or the one or more process control input/output devices via the first communication bus and to receive and read safety messages from other safety modules disposed in other safety logic solvers via the second communication bus.

41. The safety logic module system of claim 38, wherein the safety logic module communicates via the second communication bus to the another safety logic module using a time division multiplexing communication scheme.

* * * * *